US011917742B2

(12) United States Patent
Ballester Herrero et al.

(10) Patent No.: US 11,917,742 B2
(45) Date of Patent: Feb. 27, 2024

(54) METHOD FOR A COOKTOP

(71) Applicant: BSH Hausgeräte GmbH, Munich (DE)

(72) Inventors: Alberto Ballester Herrero, Saragossa (ES); Eduardo Imaz Martinez, Tudela (ES); Antonio Muñoz Fumanal, Utebo (ES); Esther Ondiviela Serrano, Saragossa (ES); Daniel Palacios Tomas, Saragossa (ES); Jorge Pascual Aza, Saragossa (ES); David Valeau Martin, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 0 days.

(21) Appl. No.: 18/077,246

(22) Filed: Dec. 8, 2022

(65) Prior Publication Data

US 2023/0099376 A1 Mar. 30, 2023

Related U.S. Application Data

(63) Continuation of application No. 16/239,787, filed on Jan. 4, 2019, now Pat. No. 11,553,564.

(30) Foreign Application Priority Data

Jan. 8, 2018 (ES) .................................. 201830008

(51) Int. Cl.
*H05B 6/12* (2006.01)
*H05B 6/06* (2006.01)
(Continued)

(52) U.S. Cl.
CPC ........... *H05B 6/1209* (2013.01); *F24C 7/083* (2013.01); *H05B 3/68* (2013.01); *H05B 6/062* (2013.01);
(Continued)

(58) Field of Classification Search
CPC ........ H05B 6/1209; H05B 3/68; H05B 6/062; H05B 6/065; H05B 2213/03; H05B 2213/05; F24C 7/083
(Continued)

(56) References Cited

U.S. PATENT DOCUMENTS

2011/0168694 A1 7/2011 Sadakata
2011/0272397 A1 11/2011 Artal Lahoz et al.
(Continued)

FOREIGN PATENT DOCUMENTS

EP 1610590 A1 12/2005
EP 3001772 A1 3/2016
(Continued)

OTHER PUBLICATIONS

National Search Report EP 19 15 0139 dated May 7, 2019.
National Search Report ES P201830008 dated Nov. 22, 2018.

*Primary Examiner* — John J Norton
*Assistant Examiner* — Simpson A Chen
(74) *Attorney, Agent, or Firm* — Michael E. Tschupp; Andre Pallapies; Brandon G. Braun

(57) ABSTRACT

In a method for a cooktop, in particular for producing and/or operating the cooktop, which has at least one variable cooking surface, the cooking surface is partitioned in an operating mode along a partitioning direction into a plurality of heating zones to which at least one heating parameter is assigned in each case in a location-dependent manner in order to heat a cooking utensil that is deposited on the heating zone. In order to ensure flexible production and/or flexible operation of the cooktop, during partitioning of the cooking surface into the heating zones in at least one peripheral region of the cooking surface, at least one cooking utensil characteristic is taken into account.

20 Claims, 3 Drawing Sheets

(51) Int. Cl.
*F24C 7/08* (2006.01)
*H05B 3/68* (2006.01)

(52) U.S. Cl.
CPC ......... *H05B 6/065* (2013.01); *H05B 2213/03* (2013.01); *H05B 2213/05* (2013.01)

(58) Field of Classification Search
USPC ....................................................... 219/447.1
See application file for complete search history.

(56) References Cited

U.S. PATENT DOCUMENTS

| | | | |
|---|---|---|---|
| 2012/0022836 A1 | 1/2012 | Ferns |
| 2016/0084507 A1 | 3/2016 | Ortmann |
| 2017/0181228 A1 | 6/2017 | Franco Gutierrez et al. |
| 2018/0347823 A1 | 12/2018 | Vera et al. |
| 2020/0329535 A1 | 10/2020 | Yun |

FOREIGN PATENT DOCUMENTS

| | | |
|---|---|---|
| JP | 2013171708 A | 9/2013 |
| WO | 2009053279 A1 | 4/2009 |
| WO | 2015015361 A1 | 2/2015 |

METHOD FOR A COOKTOP

CROSS-REFERENCES TO RELATED APPLICATIONS

This application is a Continuation Application of U.S. patent application Ser. No. 16/239,787, which was filed Jan. 4, 2019, which is claims the priority of Spanish Patent Application, Serial No. P201830008, filed Jan. 8, 2018, pursuant to 35 U.S.C. 119(a)-(d), the disclosure of which is incorporated herein by reference in its entirety as if fully set forth herein.

BACKGROUND OF THE INVENTION

The invention relates to a method for a cooktop, in particular for producing and/or operating a cooktop.

Cooktops are known to have variable cooking surfaces that can be partitioned into a plurality of heating zones to which a heat output is assigned in each case in a location-dependent manner in order to heat a cooking utensil that is deposited on the heating zone. In this case, a problem nonetheless exists that when using large cooking utensils, the heat output of heating zones that are situated in a peripheral region of the cooking surface cannot be set unless the cooking utensil projects beyond the cooking surface.

It would be desirable and advantageous to provide n improved method for a cooktop and to obviate prior art shortcomings, in particular in respect of flexibility.

BRIEF SUMMARY OF THE INVENTION

According to one aspect of the present invention, a method for a cooktop, in particular for producing and/or operating a cooktop, includes partitioning a variable cooking surface of the cooktop in an operating mode along a partitioning direction into a plurality of heating zones by taking into account a cooking utensil characteristic in a peripheral region of the cooking surface, and assigning a heating parameter to each of the heating zones in a location-dependent manner in order to heat a cooking utensil deposited on the heating zone.

In accordance with the present invention, cooktops in particular can be produced and/or operated in a flexible manner. It is advantageously possible to produce cooktops which are adapted to a specific cooking utensil characteristic. It is particularly advantageous that the control unit of the cooktop can detect the cooking utensil characteristic of the deposited cooking utensil, and adapt the cooking surface to the cooking utensil characteristic.

A "variable cooking surface" is understood in particular to mean a cooking surface which is intended to form at least one cooking zone which is adapted to at least one deposited cooking utensil. In particular, the cooking surface is a section of a cooktop plate. The variable cooking surface is preferably intended to form at least two, in particular at least three, advantageously at least four, preferably at least five, independent cooking zones in at least one operating mode. In particular, the variable cooking surface differs from a cooking surface whose cooking zones are permanently preset, in particular by means of markings on the cooktop plate. In particular, the cooktop has at least one heating element matrix and/or at least one mobile heating element, in particular an induction heating element. An "induction heating element" is understood in particular to mean a heating element which is intended to convert at least 100 W, in particular at least 500 W, advantageously at least 1000 W, preferably at least 2000 W of electrical heat output into an electromagnetic radiation field, preferably having a frequency between 10 kHz and 150 kHz, in particular between 20 kHz and 100 kHz, which is intended to be converted into heat in at least one cooking utensil, in particular at least the base thereof, as a result of magnetic reversal and eddy current effects. Alternatively, resistance heating elements, radiant elements and/or similar are conceivable. A "heating element matrix" is understood in particular to mean an arrangement which is preferably two-dimensional and advantageously regular, in particular in a square or hexagonal pattern, of at least four, in particular at least ten, advantageously at least twenty, heating elements, in particular induction heating elements. A "mobile" heating element is understood in particular to mean a heating element which is intended to be moved within at least one section of the variable cooking surface by means of at least one actuator of the variable cooking surface. The cooktop advantageously has at least one sensor unit, which is formed by the heating elements themselves in particular and is intended to detect deposited cooking utensils, in particular by means of measuring at least one inductance and/or at least one capacitance. In particular, the variable cooking surface is intended to assign a cooking zone to a detected cooking utensil, the cooking zone being adapted to a bearing surface and/or position of the cooking utensil. In particular, the cooktop has at least one control unit, which is preferably intended to evaluate measured values of the sensor unit, to calculate at least one cooking zone, and to determine heating elements which heat this cooking zone. In particular, the control unit of the cooktop is intended to activate power electronics and to set a requested heat output for a cooking zone.

A "heating zone" is understood in particular to mean a section of the variable cooking surface, to which at least one heating parameter is assigned in each case in a location-dependent manner in order to heat a cooking utensil that is deposited on the heating zone. The heating parameter can advantageously be set by a user. In particular, the heating zone has a surface which differs from cooking zone. A "location-dependent assignment" is understood in particular to mean an assignment which takes a position of an object into account. In particular, the position can take the form of an absolute position and/or relative position. An "absolute position" is understood in particular to mean a position which is defined by a distance from a reference point that is valid for all objects. A "relative position" is understood in particular to mean a position which is defined by a distance from a reference point that is defined for the respective object.

A "partitioning" of the cooking surface is understood in particular to mean that the cooking surface is broken down into a plurality of sections, which together form the entire cooking surface. In particular, the cooktop can have at least two cooking surfaces. At least one of the cooking surfaces is advantageously partitioned into heating zones. The partitioning can be effected in particular by means of setting hardware. The partitioning is preferably effected by at least one control unit of the cooktop. A "partitioning direction" is understood in particular to mean a direction perpendicular to adjoining edges of two adjacent heating zones.

A "peripheral region" of the cooking surface is understood in particular to mean a section which extends from a demarcation of the cooking surface over a distance having a maximum length of 20 cm, advantageously 15 cm, particularly advantageously 10 cm and preferably 5 cm in the direction of the cooking surface.

A "cooking utensil characteristic" is understood in particular to mean a characteristic which characterizes a property of a cooking utensil. The cooking utensil characteristic can in particular take the form of a cooking utensil material and/or a cooking utensil weight. The cooking utensil characteristic preferably takes the form of a cooking utensil extent. A "cooking utensil extent" is understood in particular here to mean a maximum spatial spread of the cooking utensil in at least one direction parallel to the cooking surface. In particular, in the case of a round cooking utensil, the cooking utensil extent can be understood to mean a diameter of the cooking utensil. The cooking utensil extent particularly preferably takes the form of a maximum extent of the cooking utensil parallel to the partitioning direction.

"Intended" is understood in particular to mean specifically programmed, configured and/or equipped. An object being intended for a specific function is understood in particular to mean that the object satisfies and/or executes this specific function in at least one application mode and/or operating mode.

A "method for producing a cooktop" is understood in particular to mean a method which is carried out before initial use of the cooktop. In particular, the method has at least one production step in which, during partitioning of the cooking surface into the heating zones in the peripheral region of the cooking surface, at least one cooking utensil characteristic is taken into account, in particular in a fixed manner.

A "method for operating a cooktop" is understood in particular to mean a method which is carried out during at least one operating mode of the cooktop. In particular, the method has an operating step in which, during partitioning of the cooking surface into the heating zones in the peripheral region of the cooking surface, at least one cooking utensil characteristic is taken into account, in particular in a flexible manner, and in particular depending on a deposited cooking utensil.

It is additionally proposed that the cooking surface can be partitioned along a vertical and/or horizontal partitioning direction. In particular, the heating zones extend over the entire horizontal extent of the cooking surface in the case of a vertical partitioning direction, and over the entire vertical extent of the cooking surface in the case of a horizontal partitioning direction. It is also conceivable to partition the cooking surface into superordinate zones, each of which is partitioned along a vertical and/or horizontal partitioning direction. It is further conceivable to arrange the heating zones concentrically relative to each other. It is thereby possible in particular to increase operating convenience. The heating zones can advantageously be embodied in an optically distinctive manner.

It is further proposed that at least one cooking utensil extent, in particular along the partitioning direction, can be taken into account during the partitioning. In particular, the cooking utensil extent can be detected by the sensor unit and transferred to the control unit. It is thereby possible in particular to increase operating convenience. It is advantageously possible to provide cooktops which are suitable for various sizes of a cooking utensil that has been deposited.

It is furthermore proposed that a cooking utensil extent which corresponds to at least twice an extent of at least one heating element of the cooktop in the peripheral region along the partitioning direction, can be taken into account during the partitioning. In particular, a minimum extent of the heating zone corresponds to the extent of the heating elements along the partitioning direction. It is conceivable for all heating elements of the cooking surface to have an identical extent in each direction. It is then possible in particular to take the cooking utensil extent into account in an advantageous manner. The cooking utensil extent that is taken into account can advantageously be selected such that it is large enough to be accurately identified, in particular despite possible tolerances of the detection means that are used.

It is moreover proposed that a cooking utensil extent of at least 15 cm, in particular at least 20 cm, advantageously at least 25 cm and particularly advantageously at least 30 cm along the partitioning direction can be taken into account during the partitioning. It is then possible in particular to take the cooking utensil extent into account in a particularly advantageous manner. The cooking utensil extent that is taken into account is advantageously large enough to be accurately identified, in particular despite possible tolerances of the detection means that are used.

It is furthermore proposed that the partitioning can be carried out in the operating mode. The partitioning is advantageously carried out in the operating mode by the control unit. The control unit can conceivably be intended to take a predefined cooking utensil characteristic into account during the partitioning. The control unit is preferably intended to take a plurality of cooking utensil extents into account during the partitioning. It is thereby possible in particular to ensure flexible partitioning of the cooking surface. Identical control units can advantageously be used in different cooktops, wherein the control units can take different cooking utensil characteristics into account in each case during the partitioning, the cooking utensil characteristics being ascertained by a respective program. In the operating mode, the program can ascertain the cooking utensil characteristic that is to be taken into account in a particularly advantageous manner by means of an ID of the cooktop and/or measured values of the sensor unit.

It is additionally proposed that the partitioning of the cooking surface can be determined during production of the cooktop. It is conceivable for the partitioning to be determined by the setting of the hardware. The cooking surface advantageously has markings which characterize the partitioning. It is conceivable for the cooking surface to have a display unit which generates the markings. For example, the display unit could have a plurality of LEDs for generating the marking. The cooking utensil characteristic to be taken into account is preferably defined during the production. The control unit is advantageously equipped during the production with the program for determining the cooking utensil characteristic that is to be taken into account. It is thereby possible in particular to ensure simple and economical partitioning of the cooking surface. It is advantageously possible to ensure an optically distinctive partitioning of the cooking surface.

According to another advantageous feature of the present invention, it is proposed that the partitioning can be carried out in the operating mode in a variable manner depending on the cooking utensil characteristic. In particular, a cooking utensil characteristic that is detected by the sensor can be taken into account during the variable partitioning by the control unit in the operating mode. It is conceivable for the display unit to generate a variable marking of the cooking surface depending on the cooking utensil characteristic. It is thereby possible in particular to ensure flexible partitioning of the cooking surface. It is advantageously possible to produce and/or operate a cooktop which is suitable for cooking utensils having different cooking utensil characteristics.

It is moreover proposed that the cooking surface viewed along the partitioning direction can be partitioned into at least one peripheral heating zone and at least one inner heating zone, and that the peripheral heating zone can be so embodied as to be larger than the inner heating zone. An “inner heating zone” is understood in particular to mean a heating zone which borders other heating zones on both sides along the partitioning direction. A “peripheral heating zone” is understood in particular to mean a heating zone which borders other heating zones on exactly one side along the partitioning direction. A difference in size between the peripheral heating zones and the inner heating zones is preferably proportional to the cooking utensil characteristic that is taken into account. It is thereby possible in particular to increase operating convenience. It is advantageously possible to avoid the problem that is known from the prior art, namely that available peripheral heating zones are too small for large cooking utensils, making it impossible to deposit a large cooking utensil on the peripheral heating zone unless the cooking utensil projects beyond the cooking surface. The partitioning allows the cooking surface to be adapted to large cooking utensils in a particularly advantageous manner, by enlarging the peripheral heating zones in such a way that the cooking utensil can be deposited on the peripheral heating zones without projecting beyond the cooking surface.

It is also proposed that in at least one further operating mode, which can be in particular identical to the operating mode, partitioning of the cooking surface into heating zones can be carried out separately for each of the cooking utensils in the event that at least two cooking utensils are deposited. The separate partitionings can advantageously differ from each other. It is particularly advantageously possible to cancel and/or effect the partitioning separately for one of the cooking utensils concerned. It is conceivable for the display unit to generate a marking of the cooking surface separately for each of the cooking utensils, it being possible to combine or switch between the markings. It is thereby possible in particular to increase operating convenience and flexibility. The cooking surface can advantageously be adapted to a plurality of cooking utensils which are deposited separately from each other.

It is further proposed that during the partitioning into the heating zones, cooking utensil characteristics of both cooking utensils can be taken into account separately in each case. It is thereby possible in particular to increase operating convenience and flexibility. The cooking surface can advantageously be adapted to a plurality of cooking utensils which have different cooking utensil characteristics and are deposited separately from each other.

According to another aspect of the present invention, a cooktop includes a variable cooking surface configured such that in an operating mode the cooking surface is partitioned along a partitioning direction into a plurality of heating zones by taking into account a cooking utensil characteristic in a peripheral region of the cooking surface, and configured such that a heating parameter is assigned to each of the heating zones in a location-dependent manner in order to heat a cooking utensil deposited on the heating zone.

In accordance with the present invention, it is thereby possible in particular to provide a flexible cooktop.

According to another advantageous feature of the present invention, the cooktop can include a control unit which is intended to carry out a method according to the invention. It is thereby possible in particular to achieve a simple structural design of the cooktop.

According to still another advantageous feature of the present invention, a system includes a cooking utensil and a cooktop as set forth above. As a result, an effective partitioning of the cooking surface can be achieved.

BRIEF DESCRIPTION OF THE DRAWINGS

Further advantages are derived from the following description of the drawings. Exemplary embodiments of the invention are illustrated in the drawings. The drawings, the descriptions and the claims contain numerous features in combination. A person skilled in the art will also regard the features individually and use them to form further effective combinations as appropriate.

DETAILED DESCRIPTION OF EXEMPLARY EMBODIMENTS OF THE PRESENT INVENTION

Figure 1:
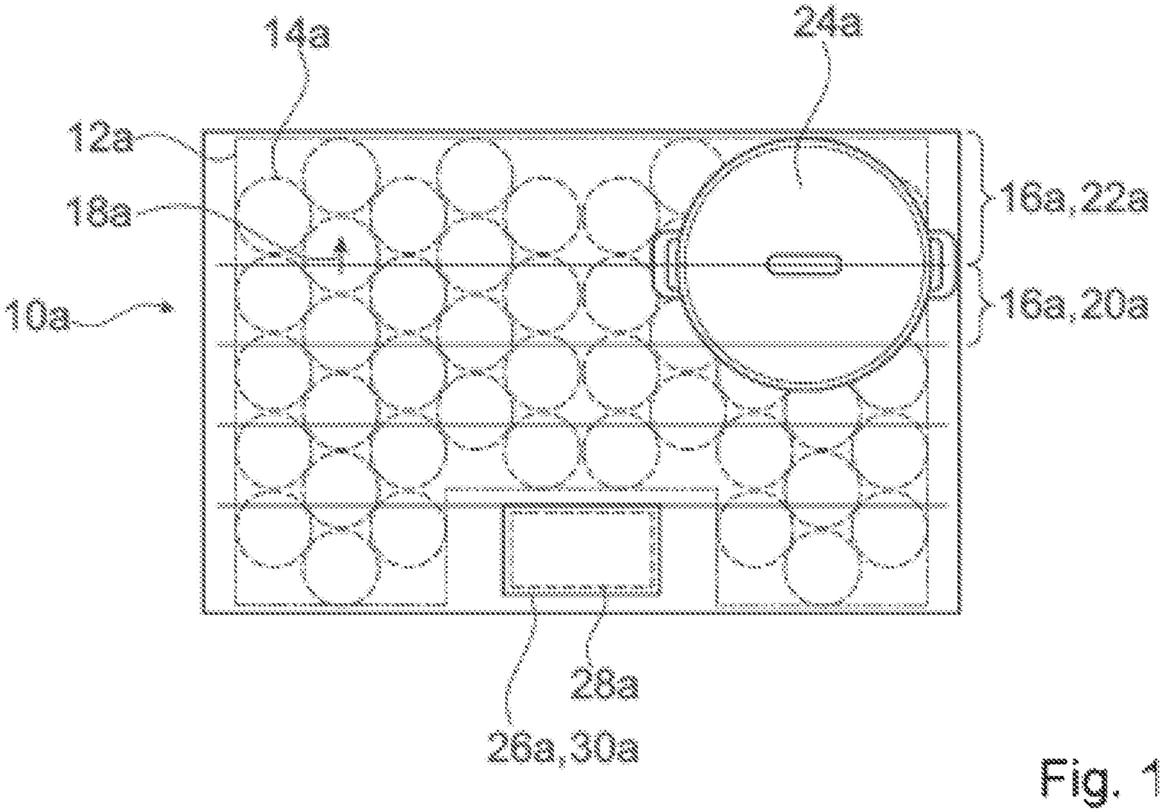
FIG. 1 shows a cooktop with a variable cooking surface.

FIG. 1 shows a cooktop 10*a*. The cooktop 10*a* has been produced using a method according to the invention. A cooking utensil 24*a* is deposited on the cooktop 10*a*. The cooktop 10*a* and the cooking utensil 24*a* are part of a system. The cooktop 10*a* has a variable cooking surface 12*a*. The cooktop 10*a* has heating elements 14*a*. The heating elements 14*a* are intended to heat the cooking utensil 24*a* that is deposited on the cooking surface 12*a*. The heating elements 14*a* are designed identically to each other. The heating elements 14*a* are arranged in the form of a matrix. The cooktop 10*a* has a sensor unit (not shown). The sensor unit extends over the entire cooking surface 12*a*. The sensor unit is intended to detect a bearing surface and a position of a deposited cooking utensil 24*a*. The sensor unit comprises the heating elements 14*a*, these being used as inductive sensors in a known manner for the purpose of detecting the cooking utensil 24*a*. The position of the cooking utensil 24*a* is defined as the center of the cooking utensil 24*a*. The cooktop 10*a* has an operating unit 26*a*. The operating unit 26*a* has a touch operating element 30*a*. The cooktop 10*a* has a control unit 28*a*. The control unit 28*a* is actively connected to the operating unit 26*a*. The control unit 28*a* is actively connected to the sensor unit. Depending on the bearing surface of the cooking utensil 24*a* that is detected by the sensor unit, the control unit 28*a* generates a cooking zone for the cooking utensil 24*a*. In order to achieve this, the control unit 28*a* combines all of the heating elements 14*a* beneath the bearing surface to form the cooking zone.

If it is difficult for the control unit 28*a* and/or the sensor unit to detect that the same cooking zone is still involved when the cooking utensil 24*a* is moved a significant distance over the cooking surface 12*a*, a conceivable approach to the solution would be for the control unit 28*a* to request an input from a user via the operating unit 26*a*, in order to confirm that the same cooking zone is still involved.

The cooking surface 12*a* is partitioned into a plurality of heating zones 16*a* in at least one operating mode, in particular a so-called "Power Move" operating mode. A partitioning into the heating zones 16*a* extends along a partitioning direction 18*a* which is aligned parallel to a depth direction of the cooking surface 12*a*. Alternatively, the partitioning could extend along a width direction of the cooking surface 12*a*. The partitioning is carried out in the operating mode by the control unit 28*a*. The actual type of partitioning is however determined during production of the cooktop 10*a*, and in particular is programmed into the control unit 28*a*. During the production of the cooktop 10*a*, the control unit 28*a* is equipped with a program for defining the cooking utensil characteristic that is to be taken into account. As a result, the same cooking utensil characteristic is always taken into account during the partitioning by the control unit 28*a*. The cooking utensil characteristic takes the form of a cooking utensil extent. The cooking utensil characteristic takes the form of a diameter of the cooking utensil 24*a*. Alternatively, the cooking utensil characteristic could take the form of a cooking utensil material or a cooking utensil weight. The cooking utensil extent is greater than twice an extent of the heating elements 14*a* along the partitioning direction 18*a*. The cooking utensil extent is greater than 15 cm.

A heat output is assigned to each of the heating zones 16*a*. Alternatively, a reference temperature could be assigned to the heating zones 16*a*. The heat output is assigned to the heating zones 16*a* depending on an absolute position on the cooking surface 12*a*. If the position of the cooking utensil 24*a* is arranged within one of the heating zones 16*a*, the heat output assigned to the heating zone 16 is set for the heating elements 14*a* of the cooking zone which corresponds to the cooking utensil 24*a*. The heating zones 16*a* can be partitioned into peripheral heating zones 22*a* and inner heating zones 20*a*. The peripheral heating zones 22*a* are so embodied as to be larger than the inner heating zones 20*a*. The cooking utensil extent of the cooking utensil 24*a* is thereby taken into account. By virtue of the larger peripheral heating zones 22*a*, the cooking utensil 24*a* can be positioned within the peripheral heating zones 22*a* without projecting beyond the cooking surface 12*a*. Since the program defines the cooking utensil extent that is to be taken into account, the program indirectly defines a ratio of extents of the peripheral heating zones 22*a* and inner heating zones 20*a*.

Figure 2:
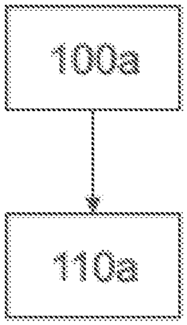
FIG. 2 shows a flow diagram for a method for producing and operating the cooktop.

FIG. 2 shows a flow diagram for a method for producing the cooktop 10*a*. In a production step 100, the control unit 28*a* is equipped with a program for defining the cooking utensil extent that is to be taken into account. As a result, the same cooking utensil extent is always taken into account during the partitioning by the control unit 28*a*. In an operating step 110, the control unit 28*a* carries out the partitioning in the operating mode. The operating step 110 follows the production step 100.

FIGS. 3 to 6 show two further exemplary embodiments of the invention. The following descriptions and the drawings are limited essentially to the differences between the exemplary embodiments, wherein in respect of identically designated components, in particular in relation to components having the same reference signs, reference can generally be made to the drawings and/or the description of the other exemplary embodiments, in particular those in FIGS. 1 and 2. In order to distinguish between the exemplary embodiments, the letter a is placed after the reference signs of the exemplary embodiment in FIGS. 1 and 2. The letter a is replaced by the letters b and c in the exemplary embodiments according to FIGS. 3 to 6.

Figure 3:
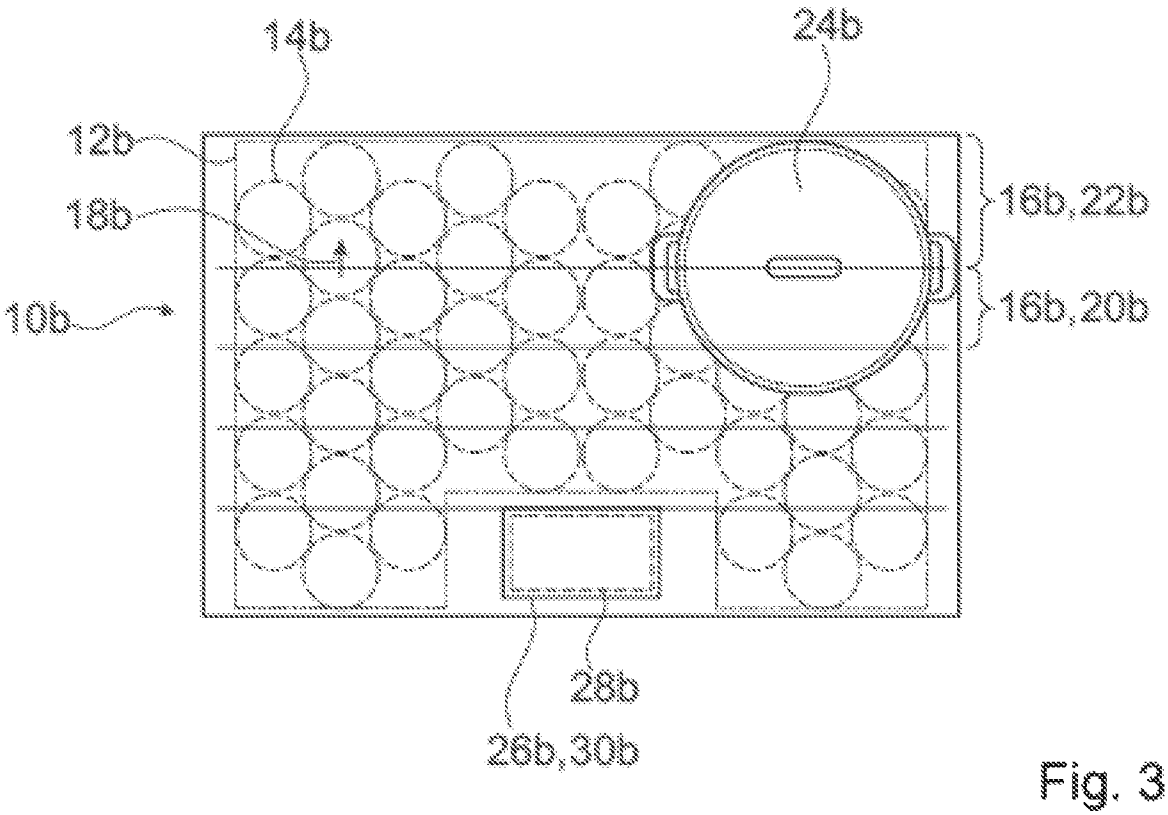
FIG. 3 shows a further cooktop with a further variable cooking surface.

FIG. 3 shows a cooktop 10*b*. The cooktop 10*b* has a control unit 28*b*. The control unit 28*b* is intended to carry out a method according to the invention. During production of the cooktop 10*b*, the control unit 28*b* is equipped with a program for ascertaining a cooking utensil extent that is to be taken into account. A partitioning of a cooking surface 12*b* into heating zones 16*b* is carried out variably depending on a cooking utensil extent. The cooking utensil extent that is to be taken into account is defined by the sensor unit. The cooking utensil extent that is to be taken into account corresponds to a cooking utensil extent, as ascertained by the sensor unit, of a cooking utensil 24*b* along a partitioning direction 18*b*. Alternatively, the cooking utensil extent that is to be taken into account could be defined by a user. The program is intended to take into account the cooking utensil extent that is ascertained by the sensor unit. The ascertained cooking utensil extent is taken into account during the partitioning by the control unit 28*b*. A heat output is assigned to the heating zones 16*b* depending on a relative position. The relative position refers to a position of the cooking utensil 24*b* along the partitioning direction 18*b* relative to a predefined reference point. The predefined reference point takes the form of the position of the cooking utensil 24*b* during the partitioning.

Figure 4:
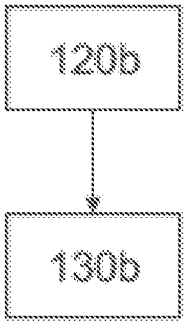
FIG. 4 shows a flow diagram for a method for operating the further cooktop according to FIG. 3.

FIG. 4 shows a flow diagram for a method for operating the cooktop 10*b*. In an operating step 120*b*, the control unit 28*b* ascertains the cooking utensil extent that is to be taken into account by means of the sensor unit. In a further operating step 130*b*, the control unit 28*b* carries out the partitioning in the operating mode, taking into account the cooking utensil extent that has been ascertained. The further operating step 130*b* follows the operating step 120*b*.

Figure 5:
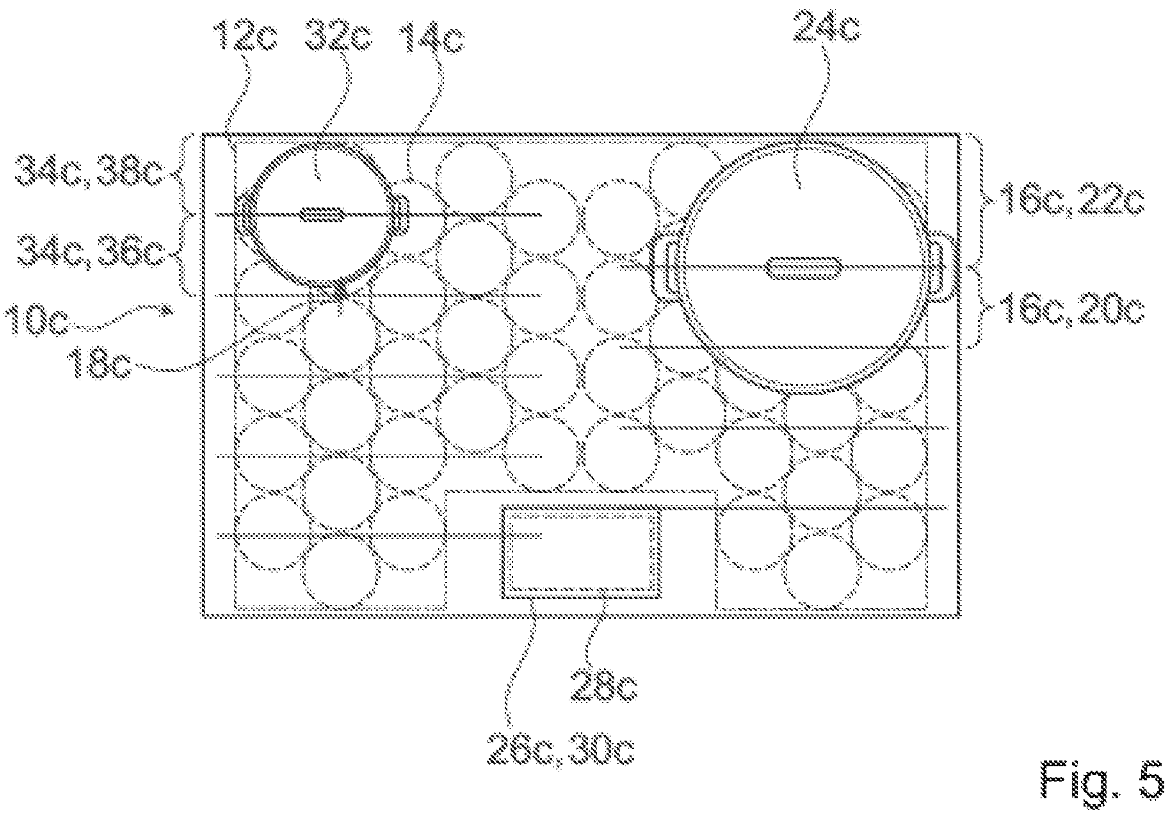
FIG. 5 shows a further cooktop with a further variable cooking surface.

FIG. 5 shows a cooktop 10*c*. The cooktop 10*c* has a control unit 28*c*. The control unit 28*c* is intended to carry out a method according to the invention. During production of the cooktop 10*c*, the control unit 28*c* is equipped with a program for ascertaining a cooking utensil extent that is to be taken into account. A partitioning of a cooking surface 12*c* into heating zones 16*c*, 34*c* is carried out variably depending on a cooking utensil extent. A cooking utensil 24*c* and a further cooking utensil 32*c* are deposited on the cooktop 10*c*. The further cooking utensil 32*c* is deposited after the cooking utensil 24*c*. The sensor unit measures a cooking utensil extent of the deposited cooking utensils 24*c*, 32*c* and transfers the cooking utensil extent to the control unit 28*c*. In the operating mode, a partitioning into heating zones 16*c*, 34*c* is carried out separately for each of the cooking utensils 24*c*, 32*c*. Cooking utensil characteristics of the cooking utensils 24*c*, 32*c* are taken into account separately during the partitioning. For the further cooking utensil 32*c*, the cooking surface 12*c* is partitioned into corresponding further heating zones 34*c* which, in comparison with the ratio of the extent of the peripheral heating zones 22*c* and inner heating zones 20*c* of the cooking utensil 24*c*, have a different ratio of the extent of further peripheral heating zones 38*c* and further inner heating zones 36*c*.

Figure 6:
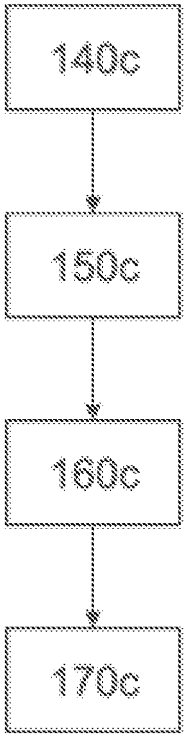
FIG. 6 shows a flow diagram for a method for operating the further cooktop according to FIG. 5.

FIG. 6 shows a flow diagram for a method for operating the cooktop 10*c*. In an operating step 140*c*, the control unit 28*c* ascertains the cooking utensil extent that is to be taken into account for the cooking utensil 24*c*. In a further operating step 150*c*, the control unit 28*c* carries out the partitioning in the operating mode, taking into account the cooking utensil extent that has been ascertained for the cooking utensil 24*c*. The further operating step 150*c* follows the operating step 140*c*. In a further operating step 160*c*, the control unit 28*c* ascertains the cooking utensil extent that is to be taken into account for the cooking utensil 32*c*. In a further operating step 170*c*, the control unit 28*c* carries out a separate partitioning in the operating mode, taking into account the cooking utensil extent that has been ascertained for the cooking utensil 32*c*. The further operating step 170*c* follows the further operating step 160*c*.

The invention claimed is:

1. A cooktop, comprising:

a variable cooking surface configured such that in an operating mode the cooking surface is partitioned along a partitioning direction into a plurality of heating zones, wherein an extent of a peripheral one of the heating zones is determined based on a selected cooking-utensil characteristic, and wherein the variable cooking surface is further configured such that a heating parameter is assigned to each of the heating zones based on an absolute position on the variable cooking surface and the heating parameters are utilized to heat a cooking utensil deposited on the respective heating zones.

2. The cooktop of claim 1, wherein the cooking surface is partitioned along a vertical and/or a horizontal partitioning direction.

3. The cooktop of claim 1, wherein the selected cooking-utensil characteristic is a cooking-utensil extent.

4. The cooktop of claim 3, further comprising a heating element in a peripheral region along a vertical and/or a horizontal partitioning direction, wherein the cooking-utensil extent corresponds to at least twice an extent of the heating element.

5. The cooktop of claim 3, wherein the cooking-utensil extent is at least 16 cm along the partitioning direction.

6. The cooktop of claim 1, wherein, when viewed along a vertical and/or a horizontal partitioning direction, the cooking surface is partitioned into a peripheral one of the heating zones and an inner one of the heating zones, and wherein the peripheral one of the heating zones is sized larger than the inner one of the heating zones.

7. The cooktop of claim 1, further comprising a control unit configured to partition the cooking surface in the operating mode along a vertical and/or a horizontal partitioning direction, and to assign the heating parameter to each of the heating zones.

8. The cooktop of claim 1, wherein in a further operating mode and arrangement of at least two cooking utensils, the partitioning of the cooking surface into heating zones is carried out separately for each of the at least two cooking-utensils.

9. The cooktop of claim 8, wherein the operating mode and the further operating mode are identical.

10. The cooktop of claim 8, wherein cooking-utensil characteristics of the at least two cooking-utensils are taken into account separately during the partitioning into the heating zones.

11. A system, comprising:

a cooking-utensil; and a cooktop comprising a variable cooking surface configured such that in an operating mode the cooking surface is partitioned along a partitioning direction into a plurality of heating zones, wherein an extent of a peripheral one of the heating zones is determined based on a selected cooking-utensil characteristic, and wherein the variable cooking surface is further configured such that a heating parameter is assigned to each of the heating zones based on an absolute position on the variable cooking surface and the heating parameters are utilized to heat a cooking utensil deposited on the respective heating zones.

12. The system of claim 11, wherein the cooking surface is partitioned along a vertical and/or a horizontal partitioning direction.

13. The system of claim 11, wherein the selected cooking-utensil characteristic is a cooking-utensil extent.

14. The system of claim 11, further comprising a heating element in a peripheral region along a vertical and/or a horizontal partitioning direction, wherein the cooking-utensil extent corresponds to at least twice an extent of the heating element.

15. The system of claim 13, wherein the cooking-utensil extent is at least 16 cm along the partitioning direction.

16. The system of claim 11, wherein, when viewed along a vertical and/or a horizontal partitioning direction, the cooking surface is partitioned into a peripheral one of the heating zones and an inner one of the heating zones, and wherein the peripheral one of the heating zones is sized larger than the inner one of the heating zones.

17. The system of claim 11, further comprising a control unit configured to partition the cooking surface in the operating mode along a vertical and/or a horizontal partitioning direction, and to assign the heating parameter to each of the heating zones.

18. The system of claim 11, wherein in a further operating mode and arrangement of at least two cooking utensils, the partitioning of the cooking surface into heating zones is carried out separately for each of the at least two cooking-utensils.

19. The system of claim 18, wherein the operating mode and the further operating mode are identical.

20. The system of claim 18, wherein cooking-utensil characteristics of the at least two cooking-utensils are taken into account separately during the partitioning into the heating zones.

* * * * *